(No Model.)
J. B. ROOT.
PIPE COUPLING.
No. 315,074. Patented Apr. 7, 1885.
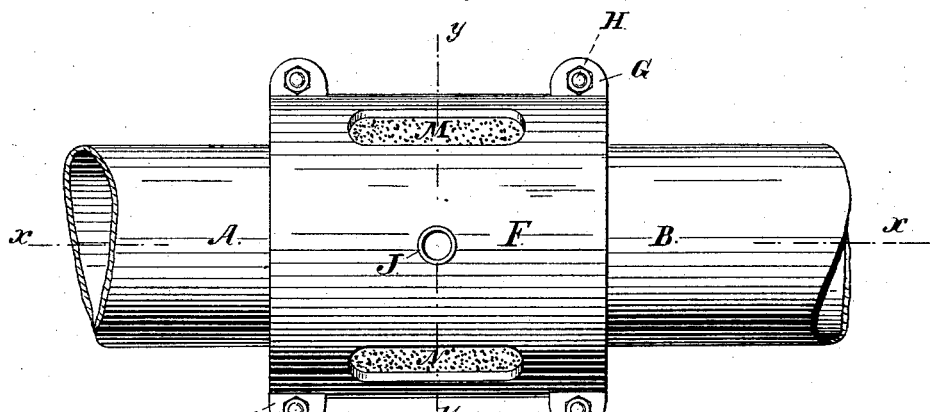
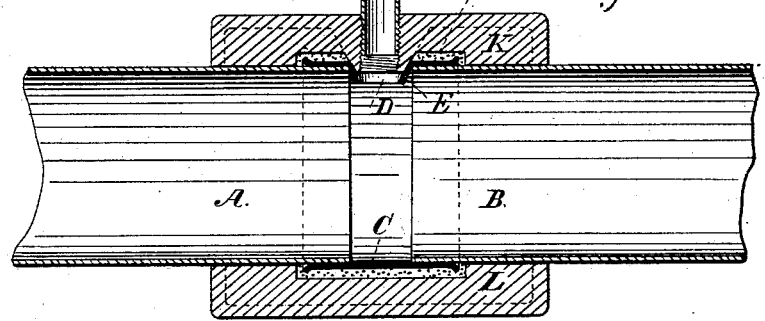
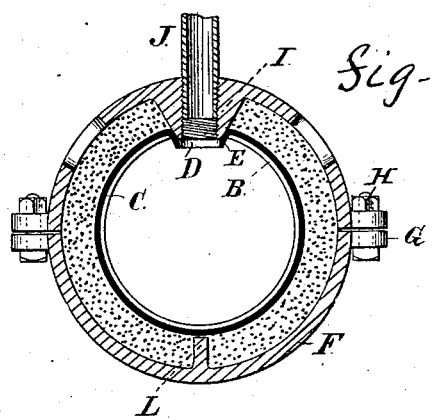
WITNESSES:
R. F. Gaylord
Robt. H. Duncan
INVENTOR
John B. Root
BY Saml. A. Duncan
ATTORNEY

UNITED STATES PATENT OFFICE.

JOHN B. ROOT, OF PORT CHESTER, NEW YORK.

PIPE-COUPLING.

SPECIFICATION forming part of Letters Patent No. 315,074, dated April 7, 1885.

Application filed April 14, 1884. (No model.)

*To all whom it may concern:*

Be it known that I, JOHN B. ROOT, of Port Chester, in the county of Westchester and State of New York, have invented certain new and useful Improvements in Pipe-Couplings, of which the following is a specification, reference being had to the accompanying drawings.

This invention relates to a coupling for metal pipe-sections; and it consists of an improved means for joining the ends of the pipe-sections and for connecting a service-pipe.

In the drawings, Figure 1 is a top view of two sections of a pipe joined by a coupling embodying my improvements. Fig. 2 is a longitudinal section of the same on the plane $x\ x$, Fig. 1; and Fig. 3 is a cross-section of the same on the plane $y\ y$, Fig. 1.

Referring to these views in detail, A and B represent the two sections of pipe.

C is a short cylinder that constitutes a uniting-sleeve for the sections of pipe. It is somewhat larger than the pipe-sections, the ends of which fit snugly into it, the ends of the sleeve being, for convenience in inserting the ends of the sections, slightly expanded. At the center of this sleeve is a service-pipe hole, D, the edges of which are depressed or forced inwardly, so as to form a conical-shaped flange, E. This flange serves to prevent the ends of the pipe-sections coming together.

F is an outer or packing shell, made in halves that are provided with ears G, by which they are clamped together around the sections of pipe with bolts H. This shell is provided with a boss, I, which is conical in shape, and reaches down and fits closely into the hole in the connecting-sleeve. This boss is screw-threaded, and receives the end of the service-pipe J, which may screw down to the requisite distance.

K is a thin rib or partition extending longitudinally from the tapered boss of the upper half of the shell to the ends of the shell, and projects radially toward the pipe-sections.

L is a similar rib or partition located at the bottom of the lower half of the packing-shell.

M and N are openings through the upper half of the shell, arranged, respectively, on opposite sides of the rib or partition.

In constructing the joint the parts are put together as shown, and cement is forced through the openings of the upper half of the shell and tamped in, so as to fill the entire space between the shell and the pipe-sections. In tamping in the packing material the radial partitions offer an obstruction to such material, preventing it from being forced around to the opposite side of the shell, and holding it so that it may be thoroughly compacted.

Although cement will preferably be used, it is quite possible to employ other like packing material.

It is preferred that the shell be in halves, as shown; but it may be divided into more parts than two, if desired, and all the parts be clamped together in the same manner shown for these halves.

What is claimed as new is—

1. The combination of the pipe-sections, the sleeve uniting the sections, and the outer shell, said shell and sleeve being provided with holes for a service-pipe, for the purpose set forth.

2. The combination of the pipe-sections, their connecting-sleeve, the outer shell made in halves, and provided with the inner boss for receiving the end of a service-pipe, for the purpose set forth.

3. The combination of the pipe-sections, the connecting-sleeve, the outer shell made in halves, and provided with the conical boss extending into the conical hole in the sleeve, substantially as described.

4. The pipe-sections, in combination with the outer shell made in halves, and provided with the longitudinal radial ribs or flanges, as and for the purpose set forth.

5. The outer shell provided with orifices for filling in the cement, and the longitudinal radial ribs, substantially as described.

JOHN B. ROOT.

Witnesses:
R. F. GAYLORD,
T. J. KEANE.